United States Patent [19]
Phillips

[11] Patent Number: 5,660,078
[45] Date of Patent: Aug. 26, 1997

[54] YOKE APPARATUS FOR RACK AND PINION

[75] Inventor: Edward H. Phillips, Troy, Mich.

[73] Assignee: Techco Corporation, Southfield, Mich.

[21] Appl. No.: 611,129

[22] Filed: Mar. 5, 1996

Related U.S. Application Data

[63] Continuation-in-part of Ser. No. 407,644, Mar. 21, 1995.

[51] Int. Cl.⁶ .................................................. B62D 3/12
[52] U.S. Cl. .................. 74/422; 74/498; 180/427; 180/428
[58] Field of Search .................. 74/422, 498; 180/427, 180/428, 147, 148; 384/37, 42

[56] References Cited

U.S. PATENT DOCUMENTS

| | | | |
|---|---|---|---|
| 3,680,443 | 8/1972 | Jenvey | 74/422 |
| 4,263,817 | 4/1981 | Taig | 74/422 |
| 4,475,413 | 10/1984 | Higuchi | 74/422 |
| 4,619,155 | 10/1986 | Futaba | 74/498 |
| 4,683,769 | 8/1987 | Mochizuki et al. | 74/422 |
| 4,709,593 | 12/1987 | Takeuchi | 74/498 |
| 4,724,717 | 2/1988 | Chikuma | 74/422 X |
| 4,788,878 | 12/1988 | Morita et al. | 74/422 |
| 4,793,433 | 12/1988 | Emori et al. | 180/148 |
| 4,936,157 | 6/1990 | Kotake et al. | 74/422 |
| 4,939,947 | 7/1990 | Toyoshima et al. | 74/422 |
| 5,058,448 | 10/1991 | Kiyooka et al. | 74/422 |
| 5,203,216 | 4/1993 | Hasegawa | 74/498 |
| 5,265,691 | 11/1993 | Konishi et al. | 180/148 |
| 5,272,933 | 12/1993 | Collier et al. | 74/498 |

FOREIGN PATENT DOCUMENTS

| | | | |
|---|---|---|---|
| 61-193966 | 8/1986 | Japan | 180/147 |
| 406092243A | 4/1994 | Japan | 180/148 |

Primary Examiner—Rodney H. Bonck
Assistant Examiner—Troy Grabow
Attorney, Agent, or Firm—Gifford, Krass, Groh, Sprinkle, Patmore, Anderson & Citkowski, P.C.

[57] ABSTRACT

A bifurcated rack bearing assembly for a steering system includes a bearing member having a pair of bearing surfaces and which is pivotable within a base. The bearing member has a pair of curved riding surfaces which slide on a curved saddle surface of the base to permit the bearing surfaces to pivot into alignment coaxial with an axis of translation of the rack. The bifurcated rack bearing assembly can be substituted for the rack bearings of conventional steering systems.

2 Claims, 3 Drawing Sheets

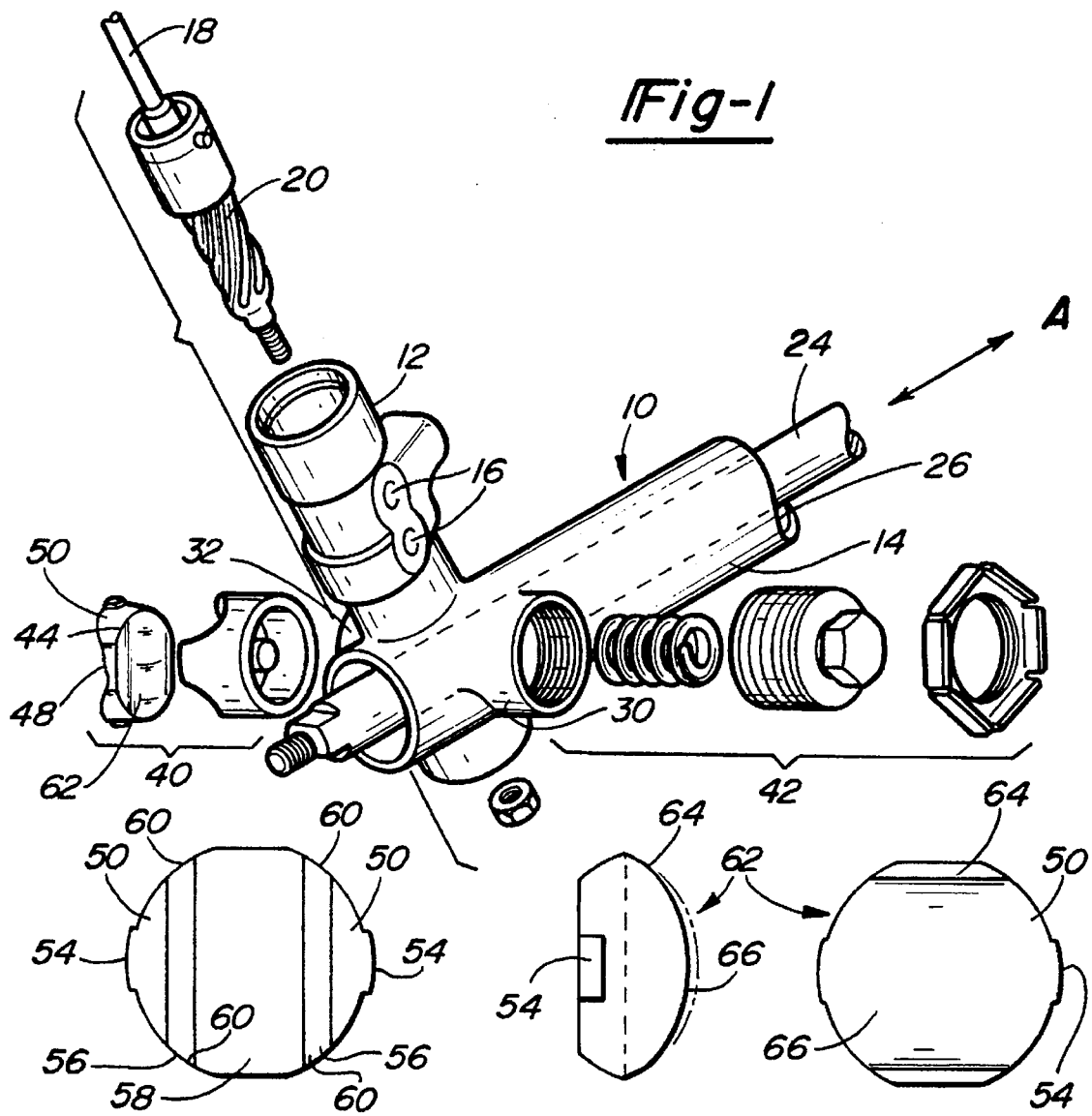
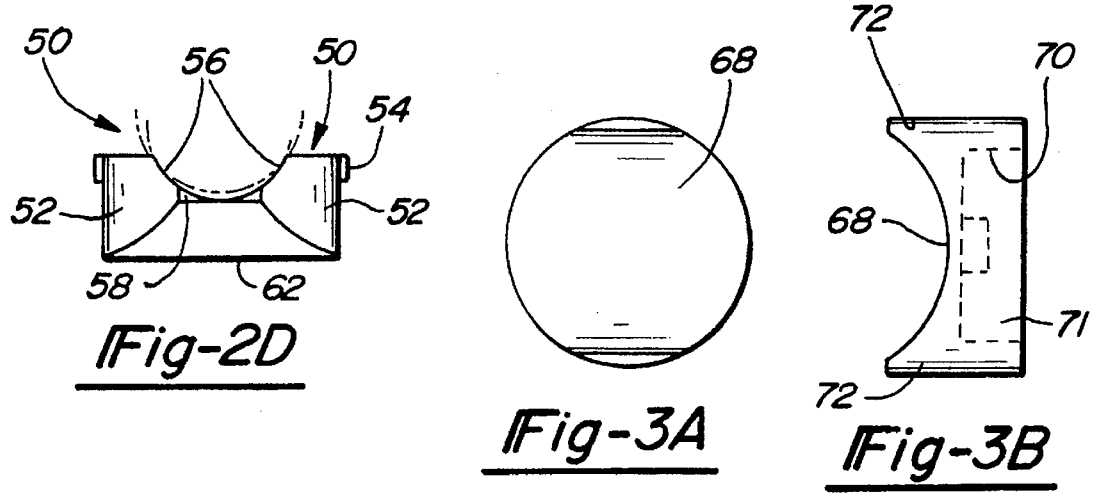

YOKE APPARATUS FOR RACK AND PINION

This is a Continuation-in-part of copending application Ser. No. 08/407,644 filed on Mar. 21, 1995.

BACKGROUND OF THE INVENTION

I. Field of the Invention

The field of the invention is directed to a rack bearing assembly for a yoke apparatus for use with a rack-and-pinion steering system.

II. Description of the Prior Art

Automotive steering systems typically include a housing having a rack driven by a pinion gear. Rotation of a steering wheel turns the pinion gear. The pinion gear meshes with a plurality of teeth formed on the rack to drive the rack in one of two reciprocal directions. The rack in turn is connected to a pair of dirigible wheels. In addition, many automotive steering systems comprise a rotary control valve which is operable to supply pressurized fluid to move a double-acting hydraulic cylinder or actuator to assist translation of the rack.

In order to keep the teeth of the pinion gear teeth and the teeth of the rack in engagement, conventional steering systems employ a yoke apparatus. The yoke apparatus includes a rack bearing which is biased to force the rack towards the pinion gear. The rack bearing has a pair of spaced apart bearing surfaces which slidingly contact the surface of the rack opposite the teeth of the rack. The rack bearing is mounted in a bore in the housing which is formed in a nominally orthogonal manner with reference to the housing in an effort to align the bearing surfaces along an axis which extends coaxially with the nominal axis of translation of the rack. A spring is mounted in the bore to force the yoke assembly against the rack and bias the bearing surfaces in order to force the teeth of the rack against the teeth of the pinion gear. Thus, the yoke apparatus operates to nominally guide the rack along the axis of translation and hold the teeth of the rack and pinion in mesh during the application of torque to the pinion gear.

In practice, it is not possible to maintain the axis of translation of the rack orthogonal to the axis of the bore. This is because of the tolerances involved in forming the bore, rack and pinion gear. Accordingly, it has been found that the axis of translation of the rack may be angled with respect to the axis of the bearing surfaces of the rack bearing, and may even undulate as a function of rotational motion of the pinion. When so misaligned, one end of each of the support surfaces engage the rack while opposite ends of the support surfaces are spaced away from the rack. As a further result, the rack bearing itself may suffer angular misalignment within the bore and jam. In fact, such yoke assemblies may be said to be over constrained or to be of non-Kinematic design.

For the above reasons, the rack is often held from smooth movement in one, or both, directions of travel. This is particularly so when the rack travels in a direction from the contacting ends towards the non-contacting ends of the support surface. The edges resist movement of the rack and the rack tends to hesitate and jerk in its movement. However, movement of the rack in an opposite direction tends to produce a smoother, less resistant movement. Frequently, the discontinuous or halting movement of the rack will be tactilly sensed by the driver.

The spring is located in an adjuster plug which is threadably inserted in the outer portion of the bore. During assembly of the yoke apparatus, the adjuster plug is rotatably driven into contact with the rack bearing with a nominal torque value of perhaps 50 in.lbs. to provide a rotational position calibration. Because of the above noted tolerances involved in forming the bore, rack and pinion gear, there results a soft contact between the adjuster plug and the rack bearing, and thus an imprecise rotational position calibration. For this reason, the adjuster plug must then be backed off by an angle of about 30 degrees in order to ensure interference free operation in the manner described above. This results in an indefinite stop position of the rack bearing should a torque level be applied that is sufficient to overcome the spring bias.

Because of the possibility of excessive operating clearance in the mesh between pinion gear and rack teeth, a spring strong enough to guarantee full engagement of pinion gear and rack teeth for all levels of applied steering wheel torque is utilized. This results in excessive Coulomb friction both with reference to the mesh of the pinion gear and rack teeth and contact of the bearing surfaces and the rack. The Coulomb friction results in hysteresis in the relationship between applied torque and rack motion. The result is a reluctance of such rack-and-pinion steering systems to return to center. This is true for both manual and power assisted steering systems and is one of the causes of imprecise "on-center feel".

A mechanism for correcting the above described deficiencies is found in the prior art in U.S. Pat. No. 3,680,443 entitled "Steering Mechanism for Motor Vehicles" by Leslie Richard Jenvey of Reading, England. In U.S. Pat. No. 3,680,443, a bifurcated yoke mechanism described therein as pad (13) and comprising upper and lower yoke members is shown but not fully described. The interface between the upper and lower yoke members of pad (13) is pictured as being the mating of a convex spherical surface on the upper yoke member with a concave spherical surface on the lower yoke member. In the case of the overall steering mechanism shown in U.S. Pat. No. 3,680,443, a pin (3) is said to allow for limited lateral motion of a rack (1) by a sliding motion thereof along the pin (3). In that condition, it would appear that the mechanism comprising the rack (1) and the upper and lower members of pad (13) is under constrained and therefore inoperative. This is because the lateral position for the rack (1) is undefined. In fact, as will be presented below, each of both the rack (1) and upper member of pad (13) have only five positional constraints.

Jenvey discloses permitting the rack to slide along pin (3) in a direction orthogonal to the axis of the rack between the bores 9 and 10. However, such a device is not satisfactory for use with modem rack and pinion steering gear. Modern steering gear utilizes positional constraints to maintain the position of the rack. These constraints include a plain bearing located remotely from the pinion. The plain bearing provides pitch and yaw constraints to the rack. The pinion provides axial location as well as roll and elevation position constraints. The yoke provides the remaining lateral constraint in the transverse direction, as well as compressive loading in the elevation direction. Thus, the yoke mechanism disclosed by Jenvey would be inoperable in a modern rack and pinion steering gear because it permits the rack to move laterally and does not provide the required lateral constraint. Accordingly, it is desirable to provide a yoke mechanism which overcomes the problems mentioned above, as well as provide lateral constraint.

SUMMARY OF THE INVENTION

Accordingly, a primary object of the present invention is to provide a yoke apparatus having a true Kinematic design wherein bearing surfaces are maintained in coaxial alignment with the axis of movement of the rack to provide smooth, constant movement of the rack in both directions of travel. Another objective of the present invention is to provide a yoke apparatus having precise rotational position calibration thus enabling a significantly reduced back off angle and the use of a considerably lighter spring for significantly reduced levels of Coulomb friction and resulting hysteresis.

Accordingly, in a preferred embodiment of the present invention, an improved yoke apparatus is presented that includes a bifurcated rack bearing assembly mounted in the housing of a conventional rack and pinion steering system. The bifurcated rack bearing assembly has a bearing disk pivotally supported in a base. The bearing disk has a groove having a pair of spaced apart bearing surfaces extending in a cylindrical manner on one side and a pair of curvilinear riding surfaces formed orthogonally in a cylindrical manner on an opposite side. The base is also cylindrical with a portion having a saddle shaped surface formed in one end for receiving the riding surfaces of the bearing disk. The saddle surface is formed in a cylindrical manner to receive the cylindrically shaped riding surfaces of the bearing disk. The saddle surface is formed to receive the riding surfaces and to permit the bearing disk to pivot thereon along an axis orthogonal to the axis of movement of the rack. In this way, both the above described over and under constraints are eliminated and the bearing surfaces can align coaxially with the preferred axis of movement of the rack.

In a first alternative preferred embodiment of the present invention, an adjuster plug is provided with an orthogonally oriented bore for receiving a matching cylindrical surface of the base. The adjuster plug and the base have orthogonal shoulders which come into precise contact during the rotational position calibration described above. The resulting precise rotational position calibration allows for utilization of a minimal back off and thus, a considerably lighter spring for biasing the bearing disk and base against the rack.

The bifurcated rack bearing assembly and lighter spring may be exchanged for a conventional rack bearing and spring with no other modification to the system. The bifurcated rack bearing assembly is configured for installation in the housing of conventional steering systems and provides improved on-center feel and improved steering performance generally. The Kinematic design of the bifurcated rack bearing assembly permits the axis of the bearing surfaces of the rack bearing to be in precise alignment with the rack which enables smooth movement of the rack. The lighter spring exerts much less biasing force than the spring of prior art devices and there is less hysteresis in the steering system.

In a second alternative preferred embodiment, an adjuster plug is provided with a flat top surface and the base member is provided with an end having an annular recess extending about a cylindrical boss. A Belleville washer extends between the recess and the plug to bias the base member and plug apart. The Belleville washer permits axial deflection of the base member within the cylindrical bore of the housing in response to movement of the rack should it undulate as a function of rotational motion of the pinion.

BRIEF DESCRIPTION OF THE DRAWINGS

The foregoing and other objects and advantages of the present invention will become readily apparent to those skilled in the art upon studying the following detailed description, when considered in connection with the accompanying drawings, in which:

FIG. 1 is an exploded perspective view of a steering system including a yoke apparatus in accordance with the invention;

FIG. 2A is an end view of a bearing member of the yoke apparatus in accordance with a preferred embodiment of the invention;

FIG. 2B is a side view of the bearing member of the yoke apparatus in accordance with a preferred embodiment of the invention;

FIG. 2C is a bottom view of the bearing member of the yoke apparatus in accordance with a preferred embodiment of the invention;

FIG. 2D is a side view of the bearing member of the yoke apparatus rotated 90° from the end view of FIG. 2A in accordance with a preferred embodiment of the invention;

FIG. 3A is a top view of a base of the yoke apparatus in accordance with a preferred embodiment of the invention;

FIG. 3B is an end view of the base of the yoke apparatus taken in accordance with a preferred embodiment of the invention;

DETAILED DESCRIPTION OF THE PREFERRED EMBODIMENTS

Figure 3C:
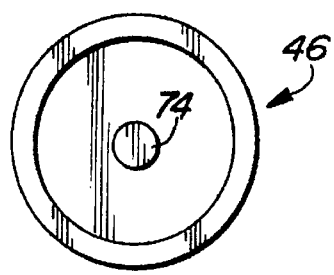
FIG. 3C is a bottom view of the base of the yoke apparatus in accordance with a preferred embodiment of the invention.
Figure 3D:
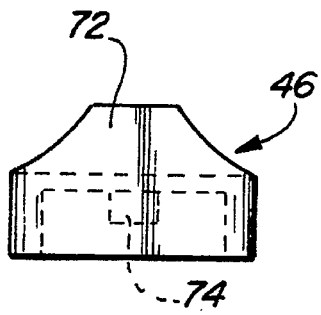
FIG. 3D is a side view of the base of the yoke apparatus rotated 90° from the end view of FIG. 3B in accordance with a preferred embodiment of the invention.

Referring now to the exploded perspective illustration of FIG. 1, thereshown is a portion of a steering apparatus for a vehicle (not shown). The steering apparatus includes a conventional housing 10, such as manufactured by the Ford Motor Co. of Dearborn, Mich. The housing includes a barrel 12 extending upwardly from a cylinder 14. The barrel 12 houses a rotary control valve for providing pressurized hydraulic fluid through ports 16 to a hydraulic actuator (not shown) for providing hydraulic assist to the steering system. One end of a torsion bar 18 is connected to a pinion gear 20. The pinion gear is mounted to mesh with a plurality of teeth 22 (FIGS. 4 and 5) of a rack 24. The rack 24 is mounted for reciprocal movement along an axis of translation "A" in an elongated cavity 26 of the housing 10. Another end of the torsion bar is connected to an input shaft of the rotary control valve and thereby to a steering wheel (neither shown).

Figure 4:
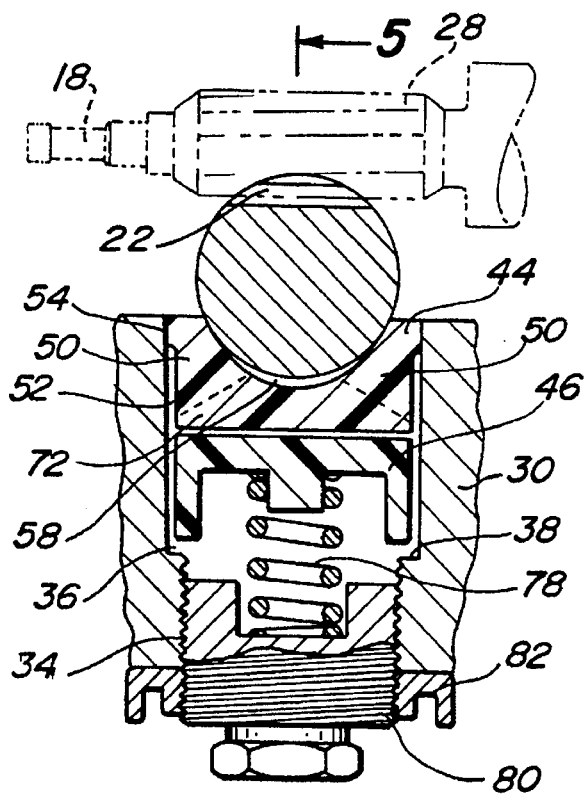
FIG. 4 is a sectional view of the yoke apparatus, rack and pinion gear of a preferred embodiment of the invention.
Figure 5:
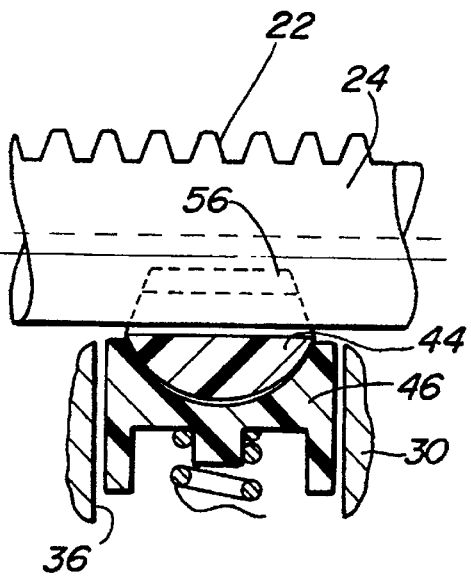
FIG. 5 is a sectional side view of a bearing member and a base of a preferred embodiment of the yoke apparatus in accordance with the invention.

As is best shown in FIGS. 4 and 5, the teeth 22 extend in a nominally axial direction on the surface of the rack. The teeth 22 of the rack 24 are formed to mesh with a plurality of teeth 28 formed on the pinion gear 20 so that movement of the pinion gear 20 by the steering wheel, input shaft and torsion bar 18 will cause reciprocal translation of the rack 24 along the axis of translation "A". As is known in the art, the rack 24 is connected to dirigible wheels to steer the vehicle.

As shown in FIG. 1, a cylindrical sleeve 30 is formed on one side of the cylinder 14 of the housing and a port 32 is formed on an opposite side of the cylinder 14. The sleeve includes a threaded aperture 34 and a bore 36 for accepting an improved yoke assembly. The bore 36 has a larger diameter than the aperture 34 and includes an annular shoulder 38 as shown in FIG. 4. The sleeve 30 and bore 36 extend in a substantially orthogonal direction with reference to the axis of translation "A" of the rack.

As shown in FIG. 1, the improved yoke assembly includes a bifurcated rack bearing assembly 40 and a spring assembly 42. The rack bearing assembly 40 is biased against the rack 24 by the spring assembly 42. The rack bearing assembly 40 includes a bearing disk 44 pivotally mounted on a base 46.

As shown in FIGS. 2A, 2B, 2C, and 2D, one side of the bearing disk 44 has a curvilinear groove 48 defining a pair of arms 50. Each arm 50 has a circumferential outer surface 52 having a diameter slightly less than the diameter of the bore 36 of the sleeve 30. A pair of pads 54 extend radially outwardly from the outer surface to slidingly locate the bearing disk 44 in a transverse manner with reference to the axis of translation "A" and the bore 36.

As shown in FIGS. 1 and 2A, the groove 48 includes a cutaway center portion 58 extending between a pair of elongated bearing surfaces 56. Each bearing surface 56 is curved and extends axially to a pair of edges 60. In combination, they define a radius of curvature equal or slightly greater than the radius of the rack 24. The bearing surfaces are spaced apart to guide the rack during movement thereof. The center portion 58 has a smaller radius of curvature than that of the bearing surfaces 56, thereby providing a deeper groove with clearance space between the bearing disk 44 and the rack 24, as shown in FIG. 4.

As shown in FIGS. 2B and 2C, the bearing disk 44 has a curvilinear bottom surface 62 to facilitate pivotal movement of the bearing disk on the base 46. The bottom surface includes a pair of riding surfaces 64 spaced on either side of a curved intermediate surface 66. The riding surfaces 64 extend orthogonally to the bearing surfaces 56 and are formed to pivotally ride on the base.

As shown in FIG. 5, the pivotal movement of the bearing disk 44 is about an axis "B" located between the bearing surfaces 56 and the axis of translation "A". This causes the bearing disk to rotate away from the direction of motion of the rack along the axis of translation "A" thus forming a hydrodynamic bearing between the bearing surfaces 56 and the rack 24. This allows the bearing disk 44 to be formed of any convenient material. However, the bearing disk is typically formed of a conventional formable bearing compound, such as a Teflon loaded material known as Turcite, which compound is available from Shamban, Inc. of Santa Monica, Calif.

The base 46, as best shown in FIGS. 3A, 3B, 3C and 3D, is generally cylindrical having a saddle surface 68 on one end and a bore 70 extending axially inwardly from an opposite end. The outer surface 71 of the base member 46 is configured to be a slip fit with the bore 36. A pair of arms 72 extend to define the saddle surface 68 with a radius of curvature generally equal to the radius of curvature of the riding surfaces 64 of the bearing disk. The axis of the curvature of the saddle surface extends in a plane which is orthogonal to the axis of the bearing surfaces 56. As shown more particularly in FIG. 4, a cylindrical boss 74 extends from a bottom surface 76 of the bore 70 to secure a spring 78, as discussed in greater detail below. As best seen in FIG. 5, the bottom surface 66 of the bearing disk 44 pivots on the saddle surface 68 of the base 46 to permit the bearing surfaces 56 of the bearing disk 44 to align perfectly with the axis of translation "A" of the rack 24 and form the hydrostatic bearing described above. As shown in FIG. 4, the bearing disk 44 and base 46 are positioned within the bore 36 of the sleeve 30 against the rack 24 and away from the annular shoulder 38 of the bore 36 by the spring 78.

During assembly, the rack bearing assembly 40 is inserted into the bore 36 through the port 32 before the rack 24 is installed in the housing 10. The rack 24 is then inserted through the cylinder 14 and the spring assembly 42 is assembled in the threaded aperture 34 of the sleeve 30. The spring assembly 42 includes the spring 78, adjuster plug 80, and lock nut 82. The adjuster plug 80 is tightened against the base 46 and then rotationally backed off a minimal predetermined distance, such as 10°, in order to permit some axial movement of the rack bearing assembly 40. The lock nut 82 is then tightened against the sleeve to maintain the position of the adjuster plug 80.

The minimal predetermined distance of 10° is significantly less than that normally encountered when assembling yoke assemblies of the prior art. This is enabled by the extra degree of freedom provided by the bifurcated rack bearing assembly 40 whereby the tightening of the adjuster plug 80 against the base 46 can be accomplished in a more precise manner thus resulting in improved rotational position calibration precision.

Figure 6:
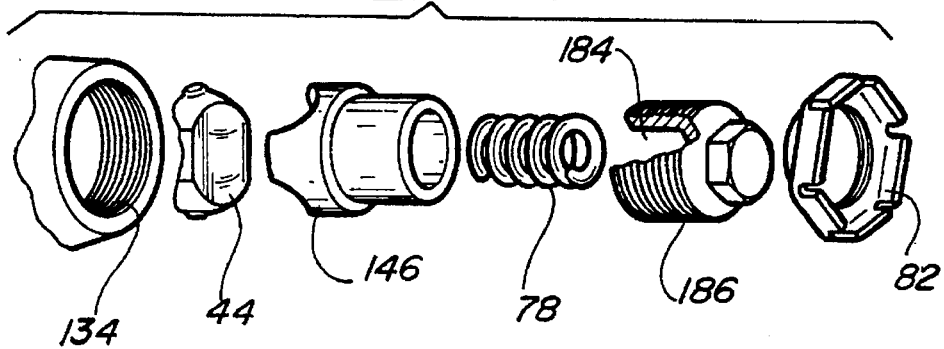
FIG. 6 is an exploded perspective view of a preferred first alternative embodiment in accordance with the invention.
Figure 7:
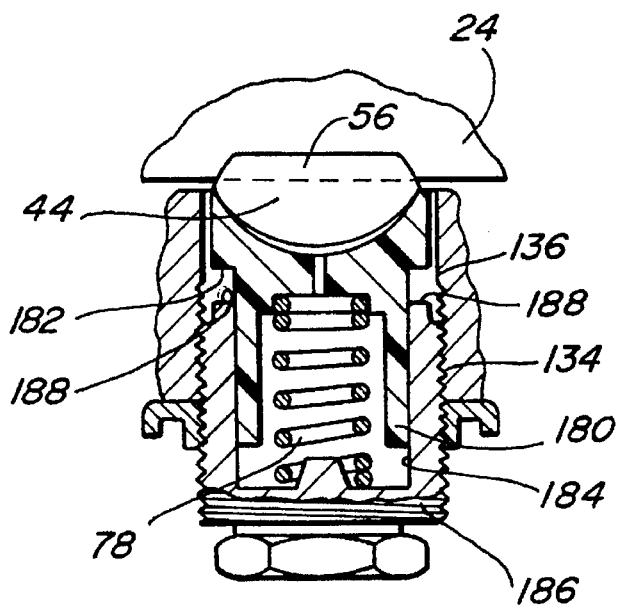
FIG. 7 is a sectional side view of the preferred first alternative embodiment of the yoke apparatus in accordance with the invention.
Figure 8:
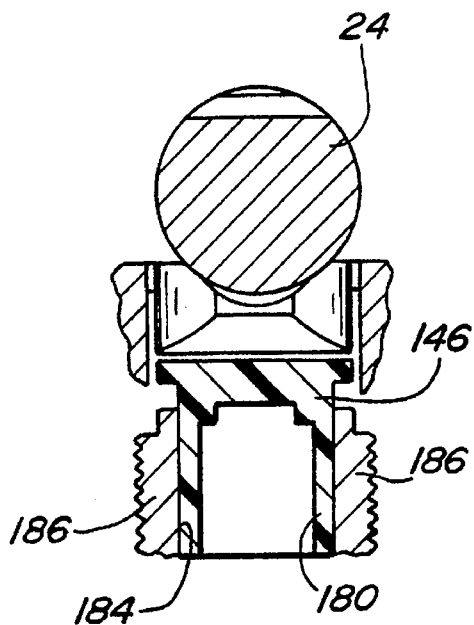
FIG. 8 is a sectional side view rotated 90° from the sectional view of FIG. 7 of the preferred first alternative embodiment in accordance with the invention.

As shown in FIGS. 6, 7 and 8, a first preferred alternative embodiment of the invention is thereshown suitable for use in steering systems such as manufactured by the Saginaw Division of General Motors of Saginaw, Mich. wherein a complete yoke assembly is assembled from one side within a juxtaposed bore 136 and threaded aperture 134. In this case, the bore 136 is formed with a smaller diameter than the minimum diameter of the threaded aperture 134. This permits insertion of a rack 24 before insertion of a bifurcated rack bearing assembly 140 within the bore 136 and a spring assembly 142 into the threaded aperture 134.

The first preferred alternative embodiment differs from the preferred embodiment disclosed above in that the first alternative embodiment utilizes a modified base 146. The bearing disk 44 is the same, again comprising a pair of pads 54 extending radially outwardly from the outer surface 52 to slidingly locate the bearing disk 44 in a transverse manner with reference to the axis of translation "A" and the bore 136. The base 146, on the other hand, has a cylindrical sleeve 180 which extends axially outwardly from an annular shoulder surface 182 to be slidingly received within a bore 184 of the adjuster plug 186. In this way, the sleeve 180 of the base 146 slides within the bore 184 of the adjuster plug 186 with the spring 78 extending therebetween, as described above.

During assembly, the adjuster plug 186 is tightened until an outer end 188 contacts the annular shoulder surface 182 of the base 146 and is then backed off a very small predetermined distance such as 3° to permit travel of the base 146 within the adjuster plug 186 and accommodate any runout of the teeth 28 of the pinion gear 20. Because the sleeve 180 slides within the adjuster plug 186, the shoulder surface 182 is positioned perfectly coplanar with the outer end 188 of the adjuster plug. The perfect orthogonal alignment permits the small backed off distance compared to prior art devices which do not maintain the coplanar relationship of the shoulder surface 182 and outer end 188. This provides still more improved rotational position calibration precision by removing the last vestige of over-constraint in the design of the assembly.

It is desirable to utilize such a small back off distance because it minimizes operating clearance in the event that applied torque (i.e., to the steering wheel) is sufficient to overcome the bias of the spring 78 and drive the teeth 22 of the rack 24 away from the teeth 28 of the pinion gear 20. In such a case, the annular shoulder 182 is merely driven a very small distance into contact with the proximate outer end 188. It is quite permissible to run the mesh between the teeth 28 and the teeth 22 at the minimal operating clearance. Because of this, a lighter spring can be utilized than those of the prior art yoke assemblies wherein indeterminate operating clearances precluded possibly unacceptable operational tooth separation. Utilizing a lighter spring serves to reduce Coulomb friction both between the rack 24 and the bearing surfaces 56, and the teeth 28 and the teeth 22. In fact, the choice of spring force is entirely governed by the amount of initial torque desired by the system designer rather than any other mechanical consideration. The result is an optimum "on-center feel" with no "stickiness" perceived by a driver.

Figure 9:
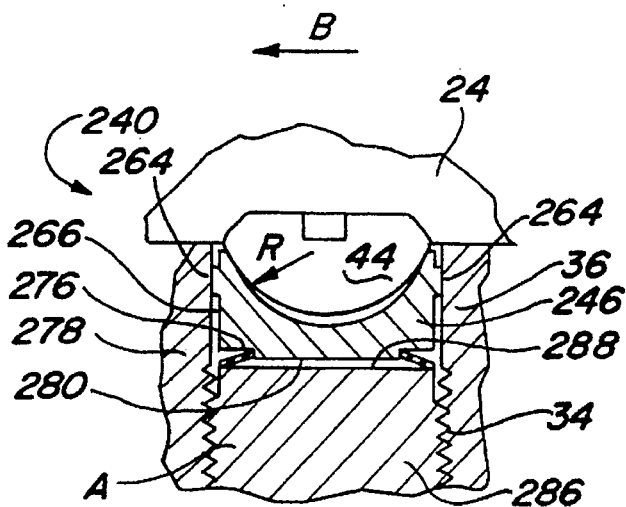
FIG. 9 is a sectional side view of a preferred second alternative embodiment of the yoke apparatus in accordance with the invention.
Figure 10:
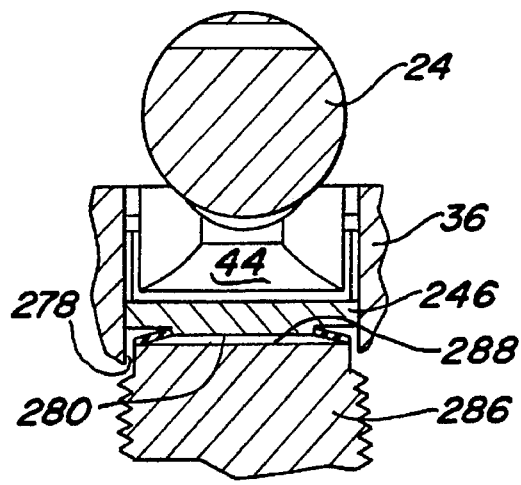
FIG. 10 is a sectional side view rotated 90° from said sectional view of FIG. 9 of the preferred second alternative embodiment in accordance with the invention.

A second alternative embodiment of the invention is shown in FIGS. 9 and 10. The second preferred alternative embodiment includes a bifurcated rack bearing assembly 240 which differs from the first alternative embodiment in that the second alternative embodiment utilizes a modified base member 246 and an adjuster plug 286 which are biased away from one another by a Belleville washer 278. The rack bearing assembly includes the bearing disk 44 as discussed above. The rack bearing assembly 240 is particularly well suited for applications where there is little clearance available for the plug to extend from the housing. One end of the base member 246 has the saddle surface 68 as discussed above. However, an opposite end has an annular recess 276 defining a cylindrical boss 280 rather than the cylindrical sleeve 180 of the first preferred alternative embodiment. A pair of pads 264 extend outwardly from an outer circumferential surface 266 of the base member 246 in a transverse direction to slidingly engage the wall surface of the bore 36. The adjuster plug 286 has a threaded surface for mounting on the threaded aperture 34, as discussed above. However, the plug 286 has a flat top surface 288. The rack bearing assembly 240 is inherently more compact than either of the rack bearing asemblies described above. For that reason rack bearing assembly 240 is often utilized in applications having little clearance. In such cases, the adjuster plug 286 may be staked in place rather than using the lock nut 82 as disclosed above.

The Belleville washer 278 is positioned in the annular recess 276 formed around the boss 280 of the base member. The Belleville washer 278 is formed from material having thickness greater than the depth of the annular recess 276 and extends to the top surface 288 of the adjuster plug 286. The Belleville washer 278 of the second preferred alternative embodiment performs the same function as the spring 78 discussed above to bias the base member 246 and bearing disk 44 against the rack. The base member 246 is constrained in the pitch and yaw directions by the Belleville washer 278 after it is compressed with a small back off distance as discussed above. Thus, in the limit the base member 246 may be regarded as being under constrained in the pitch and yaw directions because the Belleville washer 278 has finite stiffness. However, this is of no consequence to the function of the rack bearing assembly 240 in providing lateral positional constraint to the rack 24 because that function is accomplished by the pads 54 which locate the bearing disk 44 in a transverse manner as noted above.

A yoke assembly utilizing any of the bifurcated rack bearing assemblies 40, 140, and 240 is suitable for direct substitution with conventional yoke assemblies without other modification of the steering system. It is merely necessary to substitute mating rack bearing and spring assemblies of the invention for the rack bearing and spring assemblies ordinarily furnished, and substitute a weaker spring 78 or Belleville washer 278 as desired for a particular application and bearing assembly 240 may also be substituted for existing systems.

Accordingly, disclosed above are improved yoke assemblies which may be substituted for a conventional yoke assembly in a conventional steering system to greatly improve the performance thereof. The bifurcated rack bearing assemblies utilized permit perfect alignment of their support surfaces coaxially with the axis of translation of the otherwise conventional steering system's rack. Because of the improved mechanics described above, it is also possible to use a lighter spring than in the prior art systems. Accordingly, the rack moves smoothly in either direction with minimal hysteresis due to Coulomb friction and without the catching which is frequently associated with movement in one direction of the prior art devices.

While the present invention has been described in connection with the preferred embodiments of the various figures, it is also understood that other similar embodiments may be used or modifications or additions may be made to the described embodiments for performing the same function of the present invention without deviating therefrom. Therefore, the present invention should not be limited to any single embodiment but, rather, construed in breadth and scope in accordance with the recitation of the appended claims.

I claim:

1. An apparatus for maintaining a rack and pinion in meshing engagement, said rack movable within a housing along an axis of translation within said apparatus comprising:

a bearing member slidably movably mounted in a bore of said housing, said bore being aligned on an axis orthogonal to said axis of translation, said bearing member having at least one elongated upper cylindrical surface spaced apart from a generally cylindrical lower surface, said upper cylindrical surface extending in the direction of said axis of translation of said rack to slidingly receive said rack, said lower cylindrical surface of said bearing member formed about a third axis on a plane extending through said rack in a nominally orthogonal direction with reference to said axis of translation of said rack for allowing said bearing member to pivot about said third axis;

a base member slidingly movably mounted in said bore, said base member having a pair of diametrically opposed pads extending outwardly from an outer surface, said pair of pads in sliding contact with said bore of said housing, said outer surface being spaced inwardly from said bore and said pair of pads, said base member having a first outer end with an arcuate surface formed to receive a portion of said cylindrical lower surface of said bearing member and an opposite end, said arcuate surface of said base member aligned to permit said bearing member to pivot on said arcuate surface of said base member about said second axis and supporting said rack for movement along a plane extending through said axis of translation of said portion;

a Belleville washer in said bore contacting said opposite end of said base member; and a threaded adjuster plug in a threaded portion of said bore, said plug contacting said Belleville washer, said Belleville washer biasing said base member and bearing member towards said rack, said Belleville washer positioned to permit a portion of said Belleville washer to be compressed and to permit said base member to be displaced from a coaxial alignment with said axis of said bore when said rack is moved.

2. The apparatus of claim 1 further comprising said base member having an annular shoulder recess for receiving a portion of said Belleville washer.

* * * * *